United States Patent Office 3,832,193
Patented Aug. 27, 1974

3,832,193
REFRACTORY COMPOSITIONS CONTAINING DIAMMONIUM PHOSPHATE
Joseph R. Parsons, Park Forest, and Harold L. Rechter, Chicago, Ill., assignors to Chicago Fire Brick Company, Chicago, Ill.
No Drawing. Filed Feb. 25, 1972, Ser. No. 229,571
Int. Cl. C04b 35/10, 35/18
U.S. Cl. 106—65                    10 Claims

ABSTRACT OF THE DISCLOSURE

A refractory composition comprising refractory particles, water, diammonium phosphate and an acid or acid salt mixed therewith in amount to give a pH below 7.0 and not less than 3.0, the refractory particles including alumina, bentonite, clay and bauxite; the acid including phosphoric acid, sulfuric, acetic and citric acids, and the acid salt including monoaluminum phosphate and aluminum sulfate. The compositions, by varying proportions and water content, may be used as ramming, gunning and patching mixes, mortar, and for plastic, brick, block and the like. They form phosphate bonded refractory products capable of high temperature service.

BACKGROUND OF THE INVENTION

The invention relates to refractory compositions comprising particles of refractory material such as clay, alumina, bauxite, kyanite and bentonite with a bonding amount of diammonium phosphate. Refractory products made from such compositions are capable of very high temperature service. The diammonium phosphate forms strong bonding at relatively low temperatures.

The compositions, by varying proportions and water content, can be used as a ramming mix, gunning mix, patching mix, mortar, plastic, brick, block or like uses known in the art of refractory compositions.

The usual phosphate binders are phosphoric acid and the acidic monoaluminum dihydrogen phosphate in aqueous suspension. These agents, while providing high strength to a variety of refractory products, lose effectiveness on storage after blending due to reaction with certain components of refractory mixes, notably clays and fine aluminas. Further, they are irritating to the skin.

British Pat. 462,781, accepted Mar. 16, 1937, shows a ceramic composition comprising particles of refractory material including aluminum oxide with .5–5 percent of an ammonium phosphate, preferably diammonium phosphate. This composition is stored in a dry condition.

We have found that diammonium phosphate

[(NH$_4$)$_2$HPO$_4$]

used in place of the sole use of acid phosphates maintains higher bond strengths and workability by reducing deleterious aging reactions, eliminates skin irritation, offers greater facility in preparing dry as well as wet mixes, and increases the safety in manufacturing of phosphate bonded refractories.

Diammonium phosphate in water solution exhibits a slightly alkaline pH, in contrast to extremely acidic phosphate binders, but generates phosphoric acid on heat curing for bonding with reactive materials, viz:

(1) $N(H)_2HPO \longrightarrow 2NH_3 + H_3PO_4$ (2) $Al_2O_3 + 2H_3PO_4 \xrightarrow{heat} 2AlPO_4 + 3H_2O$ The alkaline material does not tend to react with refractory materials in storage, even when quite wet as in a mortar, and indefinite periods of storage without appreciable loss of binding strength are feasible. There is, however, a strong ammonia odor on storage of damp or wet refractory products containing diammonium phosphate. This ammonia odor is not only objectionable during storage and in handling for shipment, but is disliked by users, and causes loss of sales of a product otherwise of superior properties.

SUMMARY OF THE INVENTION

We have found that it is not necessary to maintain the refractory-diammonium phosphate composition completely dry in order to prevent evolution of ammonia and loss of binding strength.

We have found that the inclusion in the refractory-diammonium phosphate mixture of an amount of an acid or acid salt to reduce the pH to below 7.0 and not less than about 3.0 will prevent the evolution of ammonia from the damp or water containing composition.

Any acid will do, but aluminum phosphate and/or phosphoric acid will add some bond strength. A minimum pH of about 3.0 will insure that long shelf life with reactive clays can be maintained. A pH of 6.0–6.9 is recommended for a particularly wet product, such as a mortar, containing fine alumina and clay.

A blend of diammonium and monoaluminum phosphate improves air setting properties in some cases and suppressed evolution of ammonia from the wet mixes. Any acid addition will suppress the odor of ammonia, such as acetic acid, sulfuric acid, hydrochloric acid or aluminum sulfate.

A variety of refractory products were prepared, mainly high in aluminum oxide content, using diammonium phosphate as part or all of the binder blended with refractory grogs, clays, etc.

The particle sizing of the refractory products can be ⅜ in. or larger such as with use of calcined bauxite or flint clays, and as fine as submicron sized clays, but generally range from ¼ in. and finer for ramming mixes and plastics, and 28 mesh and finer for mortars.

The diammonium phosphate is used with the refractory particles in amount sufficient to bond the particles together on drying or on pressing and heating. The amount of diammonium phosphate may range from 0.5–20 percent or higher, but when the diammonium phosphate is used without aluminum phosphate bonding agent or other bonding agent, it is preferred to use at least 6 percent of the diammonium phosphate to obtain higher strength of bond.

DESCRIPTION OF PREFERRED EMBODIMENTS

The following examples are given to illustrate the invention. (The amounts are in percent by weight. The mesh sizes are U.S. Standard Screen.):

Example 1

A high alumina (approximately 89 percent on a fired basis) plastic refractory was formulated as follows:

| | Amount | Suitable range |
|---|---|---|
| −6 mesh alumina | 46.9 | 20–60 |
| −325 mesh alumina | 23.5 | 50–10 |
| 35 mesh kyanite | 7.8 | 0–15 |
| Kaolin clay | 3.9 | 15–0 |
| Bentonite | 2.9 | 0–10 |
| Diammonium phosphate | 5.9 | 4–12 |
| Citric acid | 2.9 | 1–5 |
| Water | 6.1 | 4–8 |

This material had an initial workability of over 40 percent (ASTM C181) and this was retained over a period of 5 months during which monitoring took place.

Example 2

Another high alumina plastic refractory formulation was made using a binder combination of monoaluminum phosphate with diammonium phosphate:

|  | Amount | Suitable range |
| --- | --- | --- |
| —6 mesh alumina | 48.7 | 20-60 |
| —325 mesh alumina | 24.4 | 50-10 |
| 35 mesh kyanite | 8.1 | 0-15 |
| Kaolin clay | 4.1 | 15-0 |
| Bentonite | 3.0 | 0-10 |
| $Al(H_2PO_4)_3$ | 4.1 | ½-8 |
| $(NH_4)_2HPO_4$ | 2.0 | 4-12 |
| Water | 5.6 | 3-8 |

The aluminum phosphate used in this example contained 10 percent $Al_2O_3$, 52 percent $P_2O_5$ and 37 percent water by weight. This formulation exhibited an average flexural strength of over 2500 p.s.i. and cold crushing strength in excess of 6000 p.s.i., with a density of 166 lbs./cu. ft. after firing at 2000° F. for five hours. The water content was adjusted for pressing brick, and more water will increase the plasticity for use as a plastic refractory.

Example 3

An advantage of the only slightly acidified phosphate binder is that it is compatible with ball clay which imparts excellent working characteristics to ramming mixes and plastics. Acid phosphate binders react in storage with ball clays. The diammonium phosphate formulations with ball clay have exhibited no reaction hardening in several months of storage. The following formula contains 84–85 percent alumina on a direct basis and is presented as a ramming mix:

|  | Amount | Suitable range |
| --- | --- | --- |
| —¼ + ⅛ inch bauxite grain | 0 | 0-25 |
| ⅛ inch bauxite grain | 55.2 | 25-70 |
| —325 mesh alumina | 23.8 | 50-10 |
| Ball clay | 7.6 | 4-12 |
| 35 mesh kyanite | 2.9 | 0-15 |
| $(NH_4)_2HPO_4$ | 3.8 | 3-11 |
| $Al(H_2PO_4)_3$ | 1.9 | ½-8 |
| Water | 4.8 | 3-8 |

Upon increasing the water to 7 percent this blend became a good working plastic. By replacing the bauxite with a coarse dense alumina grog the alumina content exceeds 90 percent.

The 85 percent alumina composition, shown above, displayed a room temperature flexural strength of about 1400 p.s.i. with a density of 164 lbs./cu. ft. after firing at 2000° F. for five hours. The 90 percent alumina composition had a modulus of rupture of 1937 p.s.i. with a density of 168 lbs./cu. ft. after the 2000° F. fire. The strength data for firing at 2000 and 2750° F. for 85 and 90 percent compositions are shown in Table I.

These blends with ball clay can be prepared in dry form for use as a gunning mix, adding water at the nozzle, for installing or maintaining refractory linings on hot or cold surfaces. The small quantity of wet aluminum phosphate addition is easily blended with the solids. A dry acid addition, such as citric acid or aluminum sulfate in place of aluminum phosphate, will facilitate blending.

TABLE I.—PROPERTIES OF BRICK PRESSED FROM COMPOSITION OF EXAMPLE 3

|  | 85% $Al_2O_3$ | | 90% $Al_2O_3$ | |
| --- | --- | --- | --- | --- |
|  | 2,000° F. | 2,750° F. | 2,000° F. | 2,750° F. |
| Bulk density, lbs./cu. ft. | 169 | 158 | 168 | 160 |
| Cold crushing strength, p.s.i. | 5,000+ | 4,500+ | 5,000+ | 5,000+ |
| Modulus of rupture, p.s.i. | 1,430 | 1,280 | 1,940 | 1,500 |
| Reheat linear change, percent | —0.19 | +1.30 | —0.19 | +0.88 |

Example 4

The compatability of the neutralized phosphate binder with ball clay has permitted the formulation of phosphate bonded mortars with superior workability. Further, the use of diammonium phosphate in a mortar eliminates the skin irritation of acid phosphates, corrosion of tools, and deterioration by reaction in storage. Also, dry phosphate mortars are feasible using the granular diammonium phosphate. The wet mortar formulation that follows, including an aqueous aluminum phosphate, has the advantage of suppressing the acrid ammonia odor:

|  | Amount | Suitable range |
| --- | --- | --- |
| 35 mesh bauxite | 32.1 | 0-70 |
| 200 mesh bauxite | 32.1 | 70-0 |
| —325 mesh alumina | 7.1 | 0-20 |
| Ball clay | 3.6 | 2-15 |
| $(NH_4)_2HPO_4$ | 10.7 | 5-20 |
| $Al(H_2PO_4)_3$ | 3.6 | ½-10 |
| Water | 10.8 | 8-15 |

This mortar contains 80 percent aluminum oxide on a fired basis, and this can be adjusted by replacing bauxite (89 percent alumina) with the purer alumina raising the alumina content up to approximately 89 percent, retaining the ball clay content shown. The pH of this mortar is about 6.

Example 5

A refractory patching compound was formulated as follows:

|  | Parts | Suitable range |
| --- | --- | --- |
| —14 mesh alumina | 50 | 15-60 |
| —325 mesh alumina | 25 | 60-15 |
| Kaolin clay | 10 | 4-15 |
| 35 mesh kyanite | 5 | 0-10 |
| Diammonium phosphate | 10 | 5-15 |
| Aluminum sulfate | 2 | 1-5 |

Water is added to the desired consistency for hot or cold patching applications in maintenance of furnace refractories, such as hearths, side walls, and roofs. This material can be stored for several months to a year as a wet mixture or indefinitely in dry form.

We have also found that diammonium phosphate refractory compositions similar to those of the above examples, but using bentonite in place of or with all other clays, have an additional advantage of not stiffening on standing. Most phosphate systems tend to gel on standing and then exhibit a considerable decrease of viscosity on working. This property has often caused undesirable slumping or running of the material after placement, such as when forming adjacent areas and particularly if the wet mass is vibrated. Citric acid additions aid adhesion to surfaces to which the refractory material is attached.

The following is an example of a refractory mortar, 80 percent alumina on a calcined bases, which does not tend to gel on standing (dry basis):

Example 6

Percent by weight

| | |
| --- | --- |
| South American bauxite, —200 mesh | 80 |
| Wyoming bentonite | 5 |
| Diammonium phosphate | 8 |
| Monoaluminum phosphate, 63% conc. | 5 |
| Citric acid | 2 |

The following refractory plastic, 85 percent alumina on a fired basis, will hold placement better than the other examples given due to the use of bentonite and citric acid:

Example 7

Percent by weight

| | |
| --- | --- |
| South American bauxite, ⅛ inch and finer | 62.3 |
| —325 mesh alumina | 19.6 |
| Western bentonite | 6.9 |
| —35 mesh kyanite | 2.9 |
| Diammonium phosphate | 3.9 |
| Monoaluminum phosphate | 2.5 |
| Citric acid | 2.0 |

We claim:

1. A storable water-wet plastic refractory composition essentially comprising:
   (a) refractory particles selected from clay, alumina, bauxite, kyanite, and mixtures thereof,
   (b) a bonding amount of diammonium phosphate,
   (c) uncombined water in amount sufficient to wet the composition, and
   (d) an acid or acid salt mixed therewith in amount to give a pH of below 7.0 and not less than 3.0.

2. A composition in accordance with claim 1 wherein the diammonium phosphate is present in from 0.5% to 20% by weight, and water is present in from 2% to 15% by weight.

3. A composition in accordance with claim 2 wherein the acid salt comprises monoaluminum phosphate.

4. A composition in accordance with claim 2 wherein the acid salt comprises aluminum sulfate.

5. A composition in accordance with claim 2 wherein the acid is citric acid.

6. A composition in accordance with claim 2 wherein the refractory particles comprise alumina.

7. A plastic refractory composition consisting essentially of:

| | Percent by weight |
|---|---|
| −6 mesh alumina | 20–60 |
| −325 mesh alumina | 50–10 |
| 35 mesh kyanite | 0–15 |
| Kaolin clay | 15–0 |
| Bentonite | 0–10 |
| Diammonium phosphate | 4–12 |
| Citric acid | 1–5 |
| Water | 4–8 |

8. A refractory mortar composition consisting essentially of:

| | Percent by weight |
|---|---|
| 35 mesh bauxite | 0–70 |
| 200 mesh bauxite | 70–0 |
| −325 mesh alumina | 0–20 |
| Ball clay | 2–15 |
| $(NH_4)_2HPO_4$ | 5–20 |
| $Al(H_2PO_4)_3$ | ½–10 |
| Water | 8–15 |

9. A refractory patching composition consisting essentially of:

| | Percent by weight |
|---|---|
| −14 mesh alumina | 15–60 |
| −325 mesh alumina | 60–15 |
| Kaolin clay | 4–15 |
| 35 mesh kyanite | 0–10 |
| Diammonium phosphate | 5–15 |
| Aluminum sulfate | 1–5 |

10. A ramming mix consisting essentially of:

| | Percent by weight |
|---|---|
| −¼ +⅛ inch bauxite grain | 0–25 |
| ⅛ inch bauxite grain | 25–70 |
| −325 mesh alumina | 50–10 |
| Ball clay | 4–12 |
| 35 mesh kyanite | 0–15 |
| $(NH_4)_2HPO_4$ | 3–12 |
| $Al(H_2PO_4)_3$ | ½–8 |
| Water | 3–8 |

References Cited

UNITED STATES PATENTS 2,116,910   5/1938   Piccard _____ 106—85

JAMES E. POER, Primary Examiner

U.S. Cl. X.R.

106—67, 68